US010532288B2

(12) United States Patent
Hall et al.

(10) Patent No.: US 10,532,288 B2
(45) Date of Patent: Jan. 14, 2020

(54) VIDEO GAME WITH IMPROVED SOCIAL NETWORKING FEATURES

(71) Applicant: ACTIVISION PUBLISHING, INC., Santa Monica, CA (US)

(72) Inventors: Gordon Hall, Doncaster (GB); Anthony Gowland, Edinburgh (GB)

(73) Assignee: Activision Publishing, Inc., Santa Monica, CA (US)

( * ) Notice: Subject to any disclaimer, the term of this patent is extended or adjusted under 35 U.S.C. 154(b) by 1206 days.

(21) Appl. No.: 14/103,781

(22) Filed: Dec. 11, 2013

(65) Prior Publication Data
US 2015/0157928 A1    Jun. 11, 2015

(51) Int. Cl.
*A63F 13/795* (2014.01)
(52) U.S. Cl.
CPC .................. *A63F 13/795* (2014.09)
(58) Field of Classification Search
CPC .......... A63F 13/00; A63F 13/61; A63F 13/69; A63F 13/79; A63F 13/795; A63F 2300/5506; A63F 2300/609; A63F 2300/5546; A63F 2300/5566
See application file for complete search history.

(56) References Cited

U.S. PATENT DOCUMENTS

| | | | |
|---|---|---|---|
| 2007/0015458 A1* | 1/2007 | Corbett ................... | A63F 13/12 455/3.06 |
| 2007/0087835 A1* | 4/2007 | Van Luchene .......... | A63F 13/12 463/43 |
| 2007/0191104 A1* | 8/2007 | Van Luchene .......... | G07F 17/32 463/42 |
| 2008/0309677 A1* | 12/2008 | Fleury .................... | G06T 19/00 345/630 |
| 2012/0015742 A1* | 1/2012 | Vanbragt ................. | H04W 4/21 463/42 |
| 2012/0088586 A1* | 4/2012 | Watkins, Jr. ............ | A63F 13/35 463/42 |

* cited by examiner

*Primary Examiner* — Jasson H Yoo
(74) *Attorney, Agent, or Firm* — Klein, O'Neill & Singh, LLP (57) ABSTRACT

The present invention provides methods and system relating to video games with improved social networking features. In some aspects of the invention, the improved social networking features include allowing players to associate their virtual items and/or characters with one or more sponsor players. The association alters the attributes of the virtual items and/or characters.

7 Claims, 7 Drawing Sheets

VIDEO GAME WITH IMPROVED SOCIAL NETWORKING FEATURES

BACKGROUND OF THE INVENTION

The present invention generally relates to video games and, in particular embodiments, to computer-implemented, video games with social networking features.

Video games provide fun and enjoyment for many. Video games allow users to participate in a variety of simulated activities. Video games allow users to perform roles and experience activities that the users may not be able or desire to experience directly, whether due to cost, danger, or equipment concerns, or simply due to a role or activity being a fantasy.

Many video games allow players, or virtual characters controlled by the players, to accumulate and/or build virtual items including, for example, weapons, equipment, buildings, vehicles, clothes, armor, and other virtual items, with various virtual items having various attributes. Many video games also allow players to control or cooperate with virtual characters, for example, non-human or human characters, avatars, companion characters, support characters, and other virtual characters. Generally, these items and/or characters will have certain attributes, for example, experience, virtual currency, level, attack rate, damage, range, hit points, production output, production capabilities, defense, armor, speed, or any other attribute associated with items and/or characters. In some cases, the player himself may also be associated with various attributes, for example, level, experience, prior game play statistics, virtual currency, and other attributes, at times with one or more virtual characters controlled by the player assigned or equipped in accordance with the attributes assigned to the player. Player, or virtual character, success in a game may depend on the attributes of the player or virtual character and the attributes of virtual items associated with, supporting or controlled by the player.

Accumulation of virtual items, or gaining experience, advancing in levels, etc., however, may not fully encompass a totality of a particular simulated activity, particularly if the simulated activity is not reflective of a solitary undertaking. Allowing for multiplayer play, which may provide player-to-player instructions, may more fully reflect simulated group activities, but even then in-game activities may not provide for a sufficient depth of immersion in an intended simulated role.

SUMMARY OF THE INVENTION

One aspect of the invention provides a computer-implemented method comprising: receiving an indication to associate a first player's item or character with a sponsor player; associating the first player's item or character with the sponsor player; and in response to the associating, altering the attributes of the first player's item or character.

In another aspect of the invention, the first player's item or character is a building.

In another aspect of the invention, the altering the attributes of the first player's item comprises altering at least one of the item's production rate or production cost attributes.

In another aspect of the invention, the first player's item or character is a weapon.

In another aspect of the invention, the altering the attributes of the first player's item comprises altering at least one of the item's damage or attack rate attributes.

In another aspect of the invention, the first player's item or character is armor.

In another aspect of the invention, the altering the attributes of the first player's item comprises altering at least one of the item's defense or armor attributes.

In another aspect of the invention, the first player's item or character is a character.

In another aspect of the invention, the altering the attributes of the first player's character comprises altering at least one of the character's hit points, damage, or defense attributes.

In another aspect of the invention, the method further comprises associating first player's item or character with at least one other sponsor player, wherein the associating of the first player's item or character with the at least one other sponsor player alters the attributes of the first player's item or character.

In another aspect of the invention, a sponsor player can only be associated with one item or character of the first player.

In another aspect the invention provides a computer implemented method useful for video game play, comprising: receiving a request to associate a sponsoring player with an item of a game player; determining if the request is valid; associating the sponsoring player with the item of the game player if the request is valid; and determining a value for a boost for an attribute of the item based on the association of the sponsoring player with the item.

These and other aspects of the invention are more fully comprehended upon review of this disclosure.

DETAILED DESCRIPTION

The present invention generally relates to video games with social networking features. In some aspects of the invention, the social networking features include allowing players to associate their virtual items and/or characters with one or more sponsoring players. The association alters the attributes of the virtual items and/or characters. Such a social networking feature, and others discussed herein, in various embodiments may provide for a more fuller game experience and/or incentivize players to strengthen their social networks and recruit new players to the video game, providing video game developers, retailers, and publishers enhanced marketing and promotional channels. Various embodiments of the improved social networking features may also reinforce various psychological principles that help keep players engaged in a video game. These and other aspects of the invention will be better understood in the context of the discussion herein.

Figure 1:
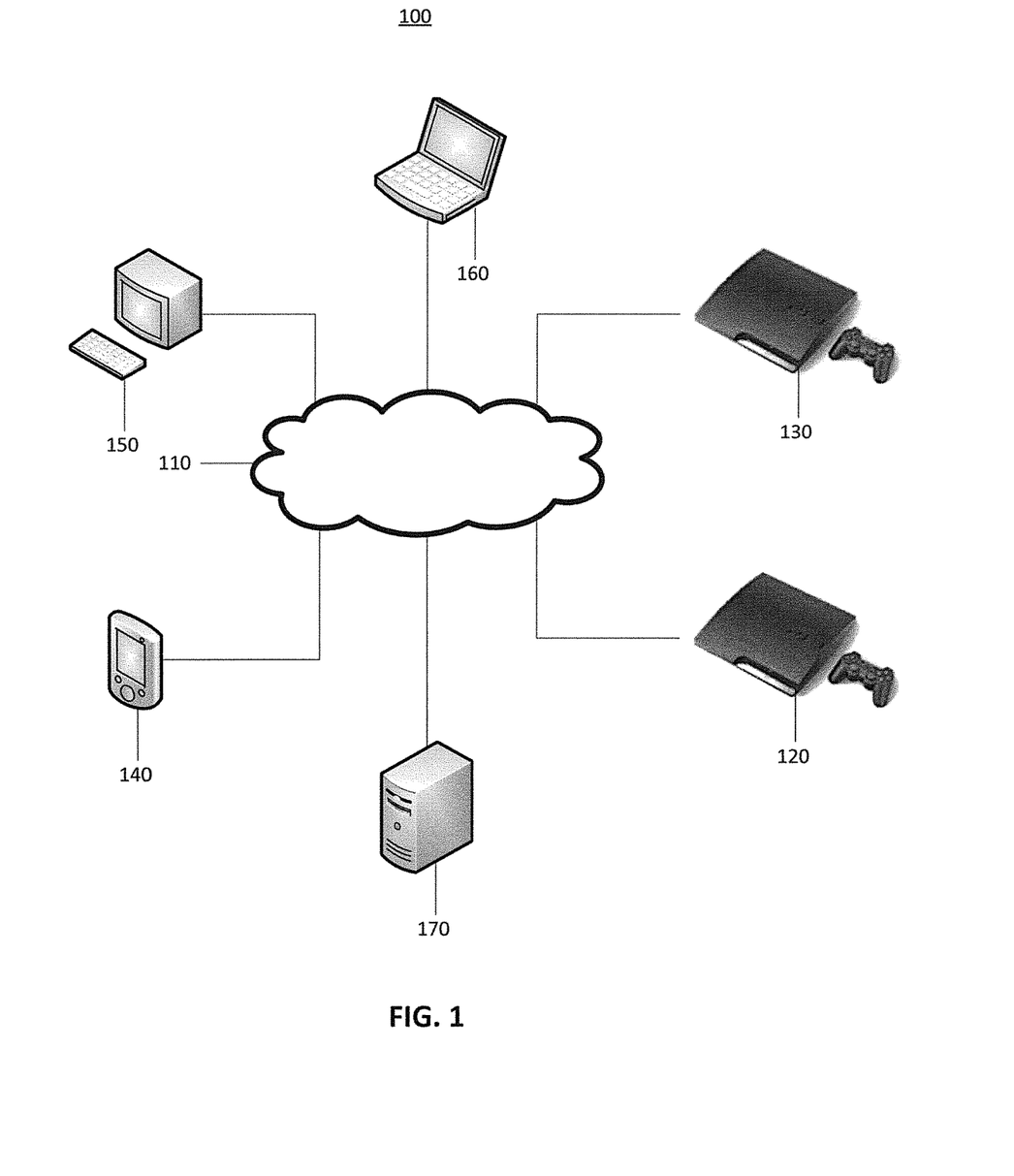
FIG. 1 is a block diagram illustrating an example of a system in accordance with aspects of the present invention.

FIG. 1 is a block diagram illustrating an exemplary system 100 in accordance with aspects of the present invention. System 100 includes a communication network 110, which may be the Internet, for example. System 100 also includes player computers 120-160 and game server 170. Player computers 120-160 may comprise various compute devices suitable for executing video games and communicating over communication network 110. In this example, system 100 comprises a first game console 120 and a second game console 130, each with associated monitor and game controller. In addition to the game consoles, player computers in various embodiments may instead or in addition comprise any other suitable compute devices such as, for example, smartphone 140, desktop computer 150, and laptop computer 160. The player computers 120-160 each have one or more processors, memory, communication circuitry, and associated hardware. Player computers 120-160 may communicate with other player computers 120-160 and/or components of system 100 by sending and receiving data through communication network 110. Of course, the number of devices shown in FIG. 1 is merely exemplary, and in many embodiments, many more devices may be present.

During game play the player computers 120-160 execute program instructions to provide for play of the video game. Video game players provide game play inputs using their respective input devices, for example touchscreens, game controllers, keyboards, mice, etc., and the associated displays and monitors display game play events.

Game server 170 provides function related to the online distribution, operation, and hosting of video games. In some embodiments, game server 170 may host and/or operate one or more video games such that players may connect to game server 170 to play the one or more video games online. In some embodiments, game server 170 may distribute one or more video games by, for example, making the one or more video games available for download to player computers 120-160. In some embodiments, game server 170 may host one or more instances of multiplayer online video games, or coordinate the hosting of such games, and allow a plurality of players to join and participate in the multiplayer online video game.

Game server 170 may also include a social networking module that provides a framework for player-to-player interaction. In some embodiments, the social networking module allows a player to designate other players as "buddies" or "friends." In some embodiments, a plurality of players may join to form a clan or team. A collection of players and the social links between them form a social network graph that can be traversed to find first-level, second-level, third-level, and n-th level relationships between players. For example, where two players are directly linked (i.e., one edge between the players), they are considered first-level friends. Where the players are connected through an intermediary friend (i.e., two edges between the players), they are considered second-level friends. In some embodiments, the social networking module provides mechanisms for players to introduce or recruit other potential players to a game generally, or to a particular instance, or play-session, of a game. In some embodiments the social networking module may allow for individuals who do not have a particular game or version of the game to participate, at least partially, in social networking aspects provided by the social networking module. In some embodiments the social networking module may have interfaces or links to other social networking facilities, for example third party social networking facilities, to allow for interactions between such individuals and players. The social networking module may, for example, provide mechanisms for players to invite other potential players to the game. If the invited player accepts the invitation, the social networking module may keep track of this data.

The social networking module may provide for social networking features in accordance with the present invention. For example, the social networking module may allow a player to associate one or more virtual items and/or characters with one or more sponsoring players, for example either or both of sponsors or recruits. The association alters one or more attributes of the virtual item and/or character. The process of sponsoring a virtual item and/or character is discussed further in connection with FIGS. 4, 5A, and 5B.

Although in this example the social networking module is integrated into game server 170, in some embodiments, the social networking module may be separate from game server 170 and may be in some other server or may be, for example, hosted and operated by a third-party (e.g., Facebook, Google, Yahoo, etc.). In some embodiments, system 100 may integrate multiple social networks, including the social network of the game server and one or more third-party social networks.

Figure 2:
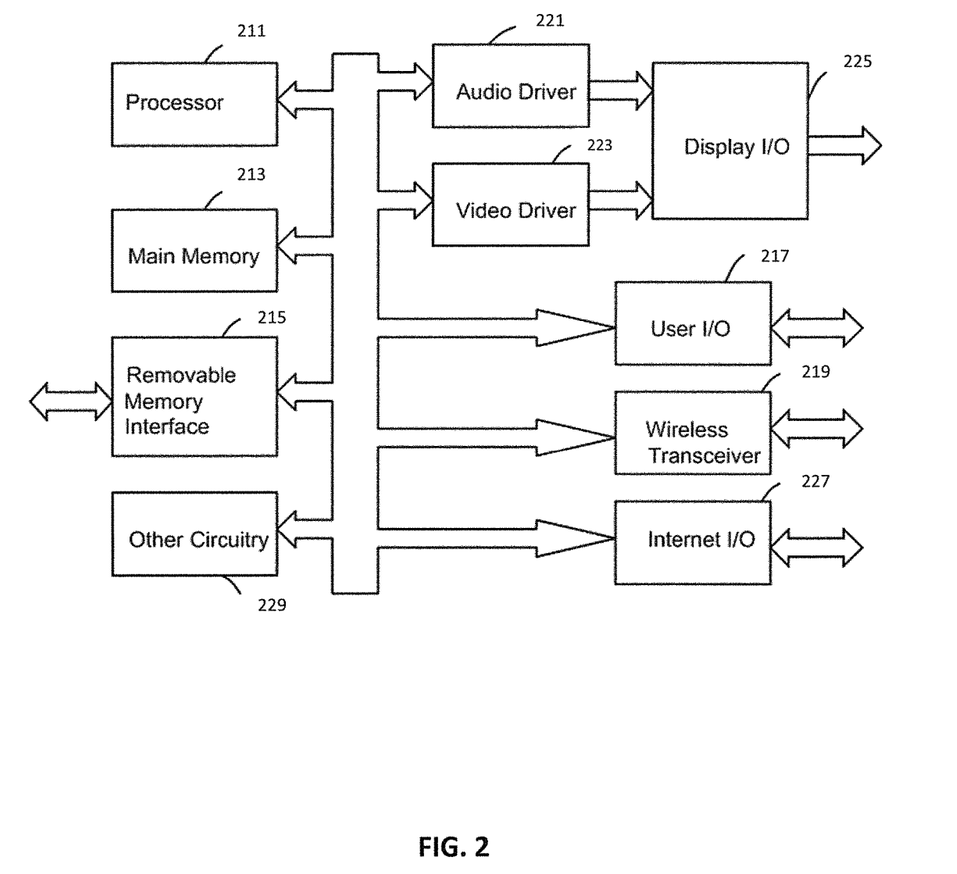
FIG. 2 is a block diagram of a player computer's processor and associated circuitry useful in accordance with aspects of the invention.

FIG. 2 is an example of a block diagram of a player computer's processor and associated circuitry useful in accordance with aspects of the invention. As shown in FIG. 2, a processor 211 is connected to other components via a bus. The other components include a main memory 213 and a memory interface 215, generally coupled to a memory device, which may be a removable memory device, for example, a CD-ROM, DVD-ROM, or Blu-ray disc drive. The processor may execute instructions retrieved from the removable memory device or some other memory device to control game play and store game state information in the main memory. For example, the instructions may be for determining possible movements, positions, and locations of a game character.

The processor is coupled to an audio driver 221 and a video driver 223. The audio driver produces sound signals and the video driver produces image signals. The sound signals and image signals are transmitted from the game console via a display I/O device 225. The display I/O device generally supplies the sound and image signals to a display device external to the game console. Sound signals may also be supplied to a peripheral device such as a toy reader.

The processor may also be coupled to a user I/O device 217, a wireless transceiver 219, an Internet I/O device 227, and other circuitry 229. The user I/O device may receive signals from a peripheral device and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 3:
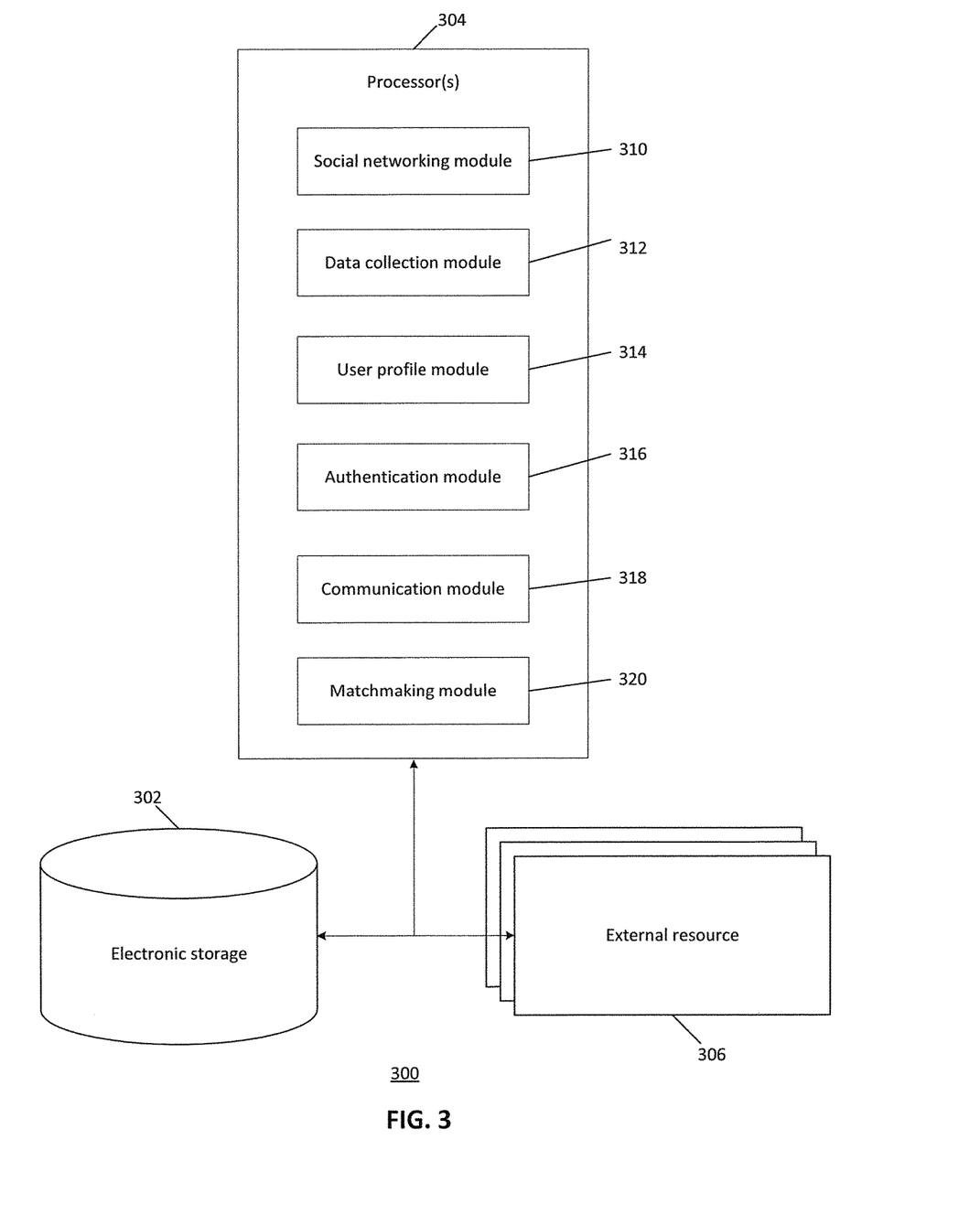
FIG. 3 is a block diagram of a game server in accordance with aspects of the invention.

FIG. 3 is an example of a block diagram of a game server 300 useful in accordance with aspects of the invention. Game server 300 is coupled to a network (not explicitly shown), for example the Internet. In some implementations, game server 300 may comprise one or more of electronic storage 302, processor(s) 304, external resources 306, and/or other components. The various components of game server 300 may be configured for electronic communication among one another. Such communication may be accomplished via one or more networks, one or more direct connections, one or more wireless connections, one or more wired connections, and/or other electronic communication media. Game server 300 may be in communication with player computers and other client computing platforms using a client/server architecture.

Processor(s) 304 may be configured to provide information processing capabilities within game server 300. For example, processor(s) 304 may configured to execute computer program modules that may include one or more of a social networking module 310, a data collection module 312, a user profile module 314, an authentication module 316, a communication module 318, a matchmaking module 320, and/or other modules. In various embodiments, these modules may perform various operations as further discussed herein. In some embodiments, social networking module 310 provides the framework for player-to-player interactions. Social networking module 310 may include a database that stores player relationships, social player profiles, player messages, and player social data. Social networking module 310 may further facilitate the social networking features of the present invention.

As discussed above, social networking module 310 may provide for social networking features in accordance with the present invention. For example, social networking module 310 may allow a player to associate one or more virtual items and/or characters with one or more sponsoring players. The association alters one or more attributes of the virtual item and/or character. The process of sponsoring a virtual item and/or character is discussed further in connection with FIGS. 4, 5A, and 5B.

In some embodiments, data collection module 312 performs operations relating to the collection of information regarding potential host systems, player data, social networks, game data, and network connection quality indicators. In some embodiments, player profile module 314 receives and/or determines user information, for example player skill levels, game system game capabilities, gaming preferences, and other player-related information. In some embodiments, authentication module 316 performs operations relating to authentication of players and potential hosts. In some embodiments, communications module 318 performs operations relating to communication with storage and/or external resources, as well as communicating over a network, for example the Internet. In some embodiments, matchmaking module 320 performs operations relating to matching player game systems with host game systems for multiplayer video gaming sessions.

In some implementations, electronic storage 302 may include information about available games, user profile data, social networking data, data collected from previous gameplay and matchmaking sessions, and/or other data. In some implementations, electronic storage 302 may comprise non-transitory electronic storage media that electronically stores information. Electronic storage 302 may include one or both of system storage that is provided integrally (e.g., substantially non-removable) with game server 300 and/or removable storage that is removably connectable to game server 300 via, for example, a port (e.g., a USB port, a firewire port, etc.) or a drive (e.g., a disk drive, etc.). Electronic storage 302 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 302 may include virtual storage resources, such as storage resources provided via a cloud and/or a virtual private network. Electronic storage 302 may store software algorithms, information determined by processor 304, information received via client computing platforms 308, and/or other information that enables game server 300 to function properly. Electronic storage 302 may be a separate component within game server 300, or electronic storage 302 may be provided integrally with one or more other components of game server 300. For example, in certain implementations, the non-transitory electronic storage media of electronic storage 302 may include a cache (e.g., L1 cache, L2 cache, etc.) of processor 304.

In some implementations, electronic storage 302, processor(s) 304, external resources 306, and/or other components (e.g., additional instances of game servers) may be operatively linked via one or more electronic communication links. For example, such electronic communication links may be established, at least in part, via a network such as the internet and/or other networks. It will be appreciated that this is not intended to be limiting, and that the scope of this disclosure includes implementations in which electronic storage 302, processor(s) 304, external resources 306, and/or other components may be operatively linked via some other communication media.

In some implementations, the external resources 306 may include services and information sources external to game server 300, for example, third-party social networking services external to game server 300. In some implementations, some or all of the functionality attributed herein to external resources 306 may be provided by resources included in game server 300.

In some implementations, processor(s) 304 may include one or more of a digital processor, an analog processor, a digital circuit designed to process information, an analog circuit designed to process information, a state machine, and/or other mechanisms for electronically processing information. Although processor(s) 304 is shown in FIG. 3 as a single entity, this is for illustrative purposes only. In some implementations, processor(s) 304 may include a plurality of processing units. These processing units may be physically located within the same device, or processor(s) 304 may represent processing functionality of a plurality of distributed devices operating in coordination.

Processor(s) 304 may be configured to execute social networking module 310, data collection module 312, user profile module 314, authentication module 316, communication module 318, matchmaking module 320, and/or other modules. Processor(s) 304 may be configured to execute modules 310, 312, 314, 316, 318, 320, and/or other modules by software; hardware; firmware; some combination of software, hardware, and/or firmware; and/or other mechanisms for configuring processing capabilities on processor(s) 304.

It should be appreciated that although modules 310, 312, 314, 316, 318, and 320 are illustrated in FIG. 3 as being co-located within a single processing unit, in implementations in which processor(s) 304 includes multiple processing units, one or more of modules 310, 312, 314, 316, 318, and 320 may be located remotely from the other modules. The description of the functionality provided by the different modules 310, 312, 314, 316, 318, and 320 provided below is for illustrative purposes, and is not intended to be limiting, as any of modules 310, 312, 314, 316, 318, and 320 may provide more or less functionality than is described. For example, one or more of modules 310, 312, 314, 316, 318, and 320 may be eliminated, and some or all of its functionality may be provided by other ones of modules 310, 312, 314, 316, 318, and 320. As another example, processor 304 may be configured to execute one or more additional modules that may perform some or all of the functionality attributed below to one of modules 310, 312, 314, 316, 318, and 320.

Figure 4:
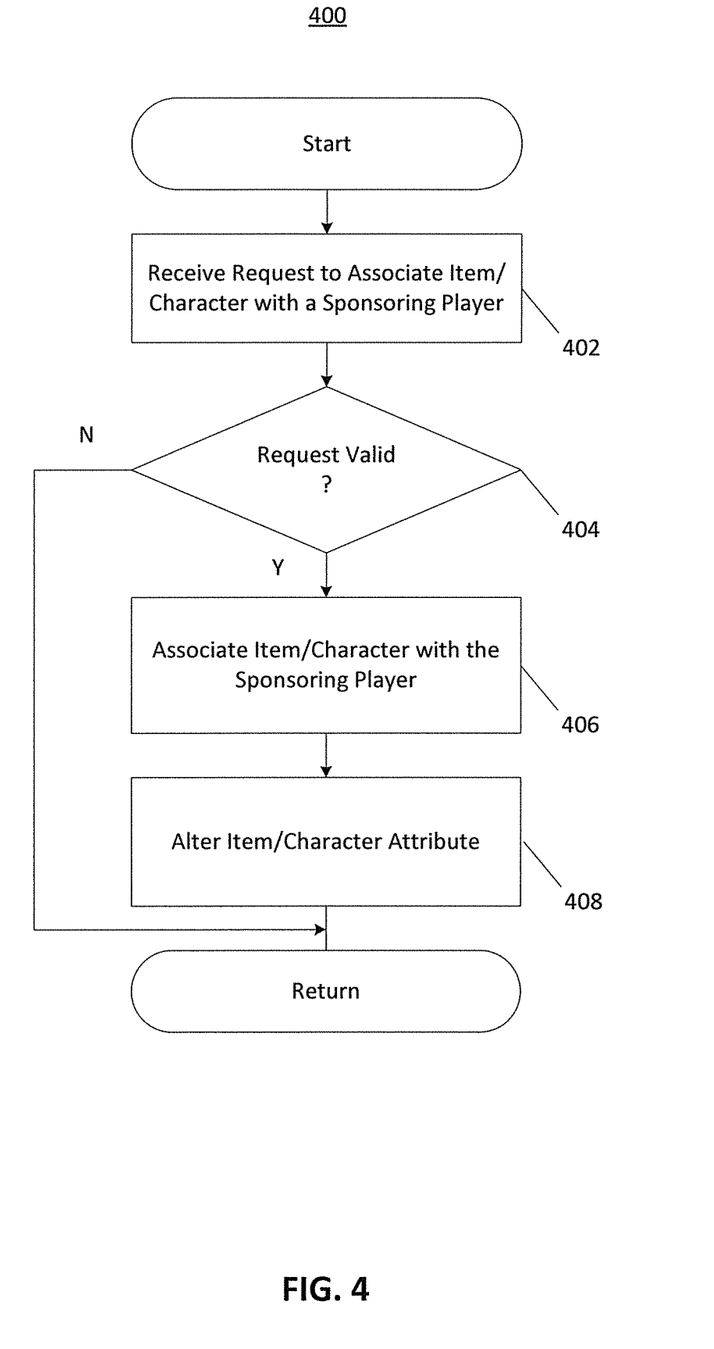
FIG. 4 is a flowchart of a process for assigning a sponsor to a virtual item or character in accordance with aspects of the present invention.

FIG. 4 shows a flow chart of an illustrative process 400 for assigning a sponsor to a virtual item and/or character in accordance with aspects of the present invention. The association alters one or more attributes of the virtual item and/or character. The process may be performed by one or more of the player computers of FIGS. 1 and 2 and the game server of FIGS. 1 and 3.

As used herein, the term virtual item and/or character is defined broadly, and encompasses, for example, weapons, equipment, buildings, vehicles, clothes, armor, and any other items. The term characters is also defined broadly, and encompasses, for example, the player's non-human or human characters, avatars, companion characters, support characters, and any other characters. Further, the term attributes is defined broadly to encompass, for example, experience, virtual currency, level, attack rate, damage, range, hit points, production output, production capabilities, defense, armor, speed, or any other attribute associated with items and/or characters.

At block 402, the process receives a request to associate a virtual item and/or character with a sponsor player. For example, in some embodiments, the player may select the virtual item and/or character to associate with a sponsor player. After selecting the item and/or character, the player may be presented a description dialog of the virtual item and/or character. The description dialog may provide the player with textual and graphical descriptions of the item of the virtual item and/or character. The description dialog may also display various attributes of the virtual item and/or character. The description dialog provides an option for the user to associate a sponsor with the selected item and/or character. For example, the description dialog may display one or more sponsor slots that allow the player to select and assign one or more sponsors to the selected item and/or character. An exemplary description dialog suitable for process 400 is described below in connection with FIGS. 5A and 5B.

In some embodiments, in addition to associating a sponsor with the selected item and/or character, the player may further associate the sponsor with one or more of the selected item and/or character's attributes. As one of ordinary skill will appreciate, the selected item and/or character's attributes may vary depending on the item and/or character. For example, a virtual firearm item may have one or more damage attributes, attack rate attributes, range attributes, reload attributes, capacity and/or magazine size attributes, recoil attributes, weight and/or ease of movement attributes, level, etc. As another example, a virtual character may have one or more strength attributes, dexterity and/or agility attributes, intelligence attributes, armor attributes, magic attributes, health and/or hit point attributes, vitality and/or health regeneration attributes, mana and/or magic regeneration attributes, speed and/or movement attributes, level attributes, etc. As yet another example, a virtual building item may have one or more production rate attributes, production cost attributes, defense attributes, health and/or hit point attributes, vitality and/or health regeneration attributes, attack rate attributes, level attributes, etc.

In some embodiments, the description dialog provides a list of sponsors eligible for associating with the selected item and/or character. In some embodiments, the list is displayed along with the type and degree of alteration that would be conferred on the selected item and/or character.

In some embodiments, the list of eligible sponsors may be determined based on the player's social network (e.g., the player's first-level or direct friends, any friends of the player's first-level or direct friends, friends that were recruited by the player, all available players, etc.). Alternatively or additionally, the list of eligible sponsors may be determined based on some characteristic of the potential sponsor (e.g., only players exceeding a certain level may be sponsors). In some embodiments, the description dialog may match the player with other players who may be suitable sponsors.

At block 404, the process determines if the request to associate a virtual item and/or character with a sponsor player is valid. The criteria for determining the request's validity will vary. In some embodiments, for example, the request's validity may depend on the number of items and/or characters associated with a given sponsor. For example, the process may specify that a player may only associate a predefine number of items and/or characters (e.g., one item and/or character, five items and/or characters, ten items and/or characters, etc.) with a particular sponsor. Predefining and limiting the number of a items and/or characters a player can associate with a particular sponsor provides certain advantages, including encouraging the player to strengthen his social network and seek out additional sponsors so that the player can maximize the performance of his items and characters.

In some embodiments, the request's validity may depend on the number of sponsors associated with the selected item and/or character. For example, the process may specify that a given item and/or character may not be associated by more than a predefined number of sponsors (e.g., one sponsor, five sponsors, ten sponsors, etc.). Of course, these examples of determining the request's validity are merely exemplary, and other criteria may be used. Further, in some embodiments, the determination of the request's validity may be performed in block 402 when the process provides a list of eligible sponsors.

At block 406, the process associates the virtual item and/or character with the sponsor player if the request was deemed valid in block 404. In some embodiments, the sponsor may be notified that he has been associated with the player's item and/or character. In some embodiments, the sponsor may derive some benefit, such as receiving a virtual reward and/or item. In some embodiments, the description of the item and/or character may be updated to reflect the sponsorship.

At block 408, the process alters the virtual item and/or character attribute. In some embodiments, the process may alter a default or main attribute of the virtual item and/or character. For example, when a sponsor is associated with a weapon item, the process may automatically increase the weapons default or main attribute (e.g., damage, attack rate, or some other default attribute). In some embodiments, the degree of alteration may depend on the level of the sponsor. For example, sponsors exceeding a particular level (e.g., level 10, 15, 20, etc.) may provide increased alterations. In some embodiments, the degree of alteration may depend on how many sponsors have previously been associated with the item and/or character. In some embodiments the process changes the degree of alteration over time based on a characteristic associated with the sponsoring player. For example, the process may increase the degree of alteration if a game character controlled by the sponsoring player increases in game experience or game level. In some such embodiments, the process may periodically check the game character's level of the sponsoring player, and update the degree of alteration accordingly. Similarly, in some such embodiments, the process may receive updates when the game character's level of the sponsoring player changes, and update the degree of alteration in response to the notification of the change in level.

Figure 5A:
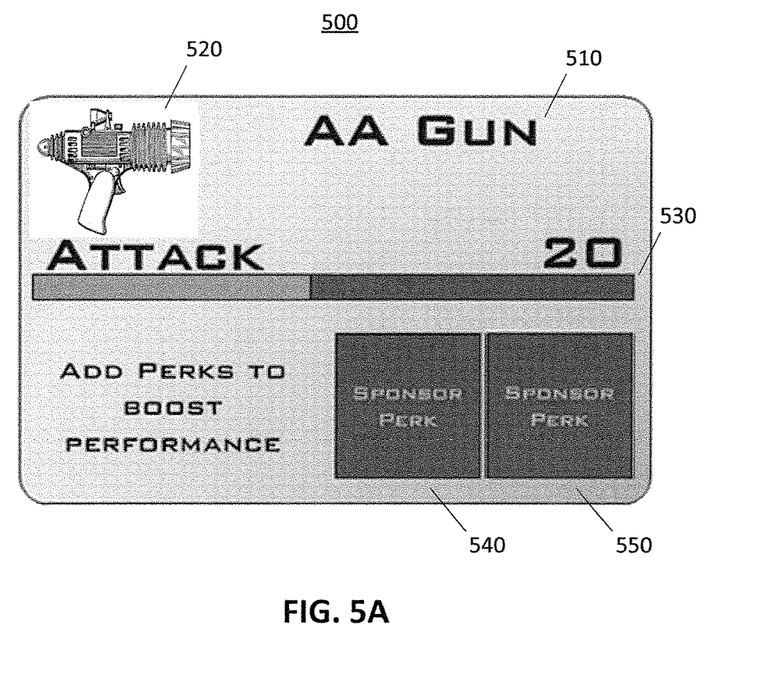
FIG. 5A is an illustration of a description dialog in accordance with aspects of the invention.
Figure 5B:
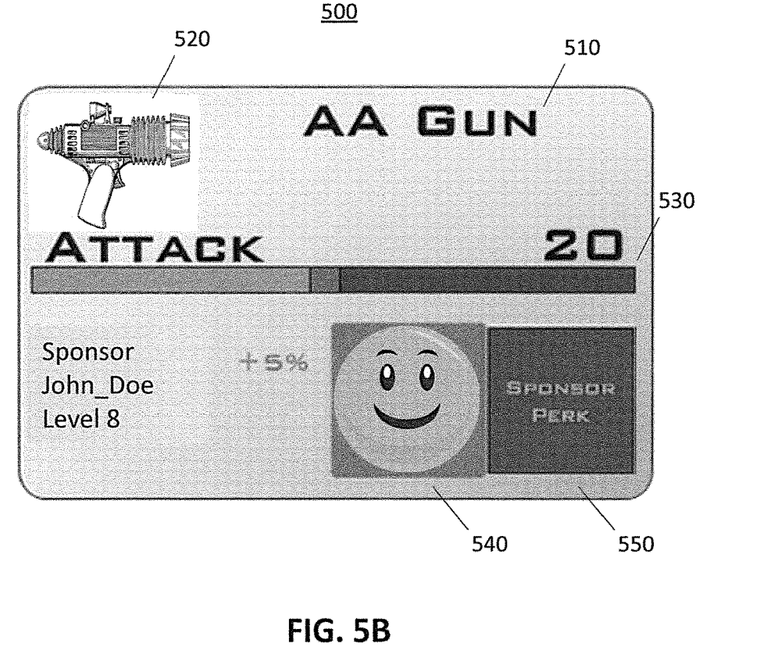
FIG. 5B is an illustration of a description dialog in accordance with aspects of the invention.

FIGS. 5A and 5B illustrate an exemplary description dialog 500 in accordance with aspects of the invention. Description dialog 500 may include a textual description of the item and/or character 510 and a graphical description of the item and/or character 520. Description dialog 500 may also include one or more attributes 530. In this example, only one attribute (i.e., attack) is displayed, but many attributes may be displayed in other embodiments. Description dialog 500 may also include one or more sponsor slots 540-550. Sponsor slots 540-550 allow the player to associate one or more sponsors with the item and/or character.

In FIG. 5A, the sponsor slots 540-550 are empty and not associated with any sponsors. According the attributes of the item are unaltered and in their default state. In FIG. 5B, the first sponsor slot 540 has been associated with a sponsor with a username "John_Doe." As indicated in FIG. 5B, John_Doe's avatar or profile image is displayed in first sponsor slot 540 and John_Doe is a level 8 player. In some embodiments, the description of the alteration may be displayed or, otherwise differentiated from the default attributes. In FIG. 5B, for example, a textual description of the alteration 560 and a graphical description of the alteration 570 are displayed. The textual and graphical descriptions of the alteration may be highlighted or otherwise differentiated from the default descriptions to visually reward the player associating the item and/or character with the sponsor.

The type and amount of alteration made to the one or more attributes may vary between embodiments. In some embodiments, for example, the alteration may depend on the level of the sponsor (e.g., higher-level sponsors confer greater benefits vs. static benefit for all sponsors). In some embodiments, the alteration may depend on the number of sponsors previously associated with the item and/or character (e.g., increasing numbers of sponsors provides an increasing or diminishing rate of benefit). In some embodiments, the player may (or may not) have the option to specify a subset of attributes to apply the alteration.

In some embodiments, description dialog 500 provides a list of sponsors eligible for associating with the selected item and/or character. In some embodiments, the list of eligible sponsors may be determined based on the player's social network (e.g., the player's first-level or direct friends, any friends of the player's first-level or direct friends, all available players, etc.). Alternatively or additionally, the list of eligible sponsors may be determined based on some characteristic of the potential sponsor (e.g., only players exceeding a certain level may be sponsors). In some embodiments, the description dialog may match the player with other players who may be suitable sponsors.

Figure 6:
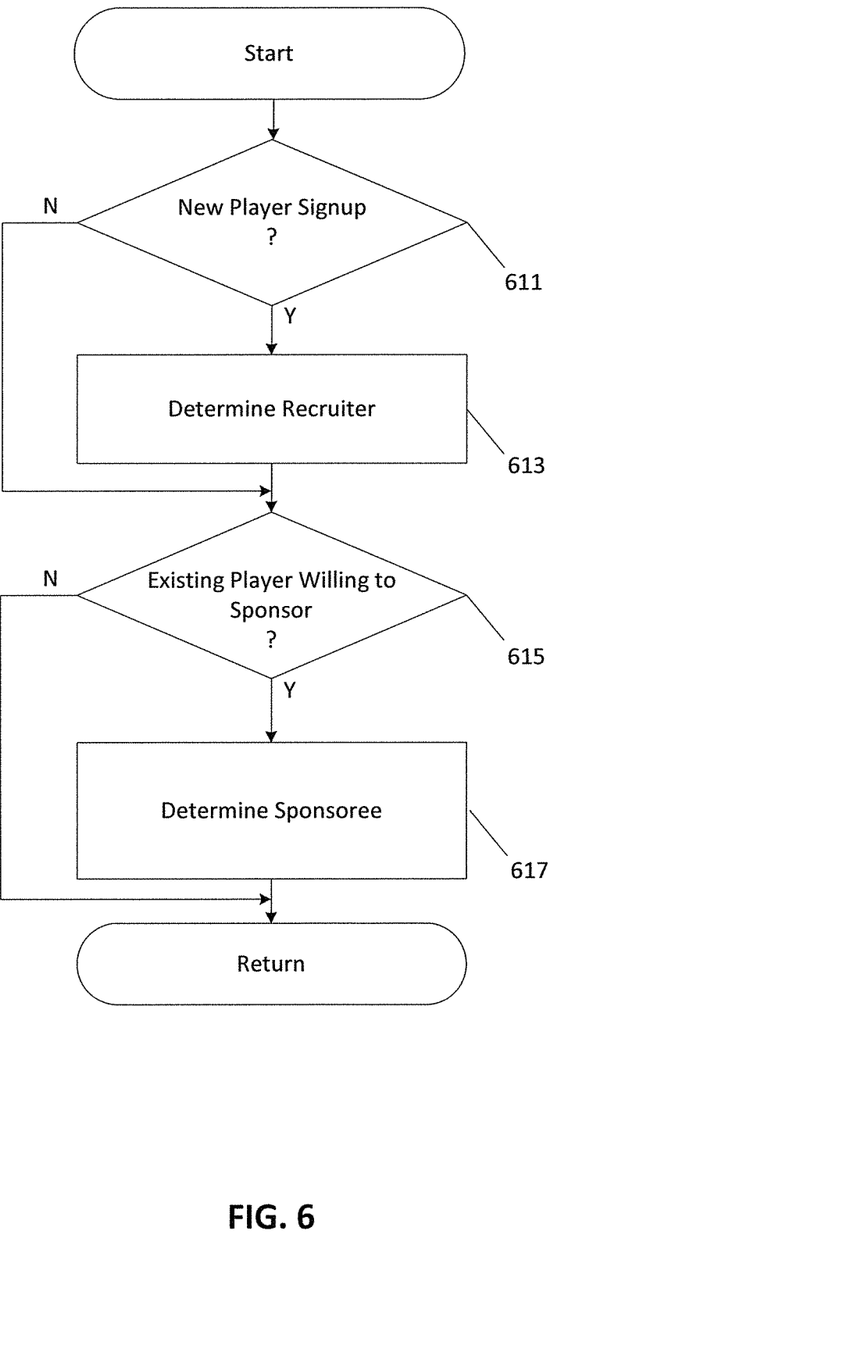
FIG. 6 is a flow diagram of a process for determining available sponsoring players in accordance with aspects of the invention.

FIG. 6 is a flow diagram of a process for determining available sponsoring players. In some embodiments the process is performed by a system such as the system of FIG. 1, in some embodiments by the game server 170 of the system of FIG. 1 or the game server 300 of FIG. 3, and in some embodiments by the social networking module 310 of the game server of FIG. 3. In some embodiments the process is performed as part of the process of FIG. 4, and in some embodiments the process is performed as a pre-process to the process of FIG. 4.

In block 611 the process determines if a player singing up for play of a game is a new player. In some embodiments the process determines if the player is a new player by determining if the player is first registering a purchase of the game or of use of the game. In some embodiments the process determines if the player is a new player by receiving an initial key from the player indicating a right or permission to use the game. The key may be received as part of a registration process for use of the game, for example, and may be a unique key distributed by a publisher of the game. In some embodiments the process determines if the player is a new player upon receiving a registration request from the player with a unique username, with the registration procedure for example enforcing a requirement that each unique player have a unique username.

If the process determines that the player is a new player, the process proceeds to block 613. Otherwise the process proceeds to block 615.

In block 613 the process determines an identity of a recruiter of the new player, if any. A recruiter of the new player is, in most embodiments, a pre-existing player identified by the new player, for example as part of a registration process. In some embodiments a recruiter of the new player is identified by way of other information obtained as part of the registration process of the new player.

In block 615 the process determines if an existing player is willing to be a sponsor for another player. In some embodiments the process determines if the existing player is willing to be a sponsor for another player by way of receiving an indication from the other player, for example a message sent from a computer device operated by the existing player indicating consent of sponsorship of the other player.

If the process determines the existing player is willing to be a sponsor for the other player, the process proceeds to block 617. Otherwise the process returns.

In block 617 the process determines the identity of the player being sponsored. In some embodiments the identity of the player being sponsored is provided in the message indicating consent of sponsorship.

The process thereafter returns.

Figure 7:
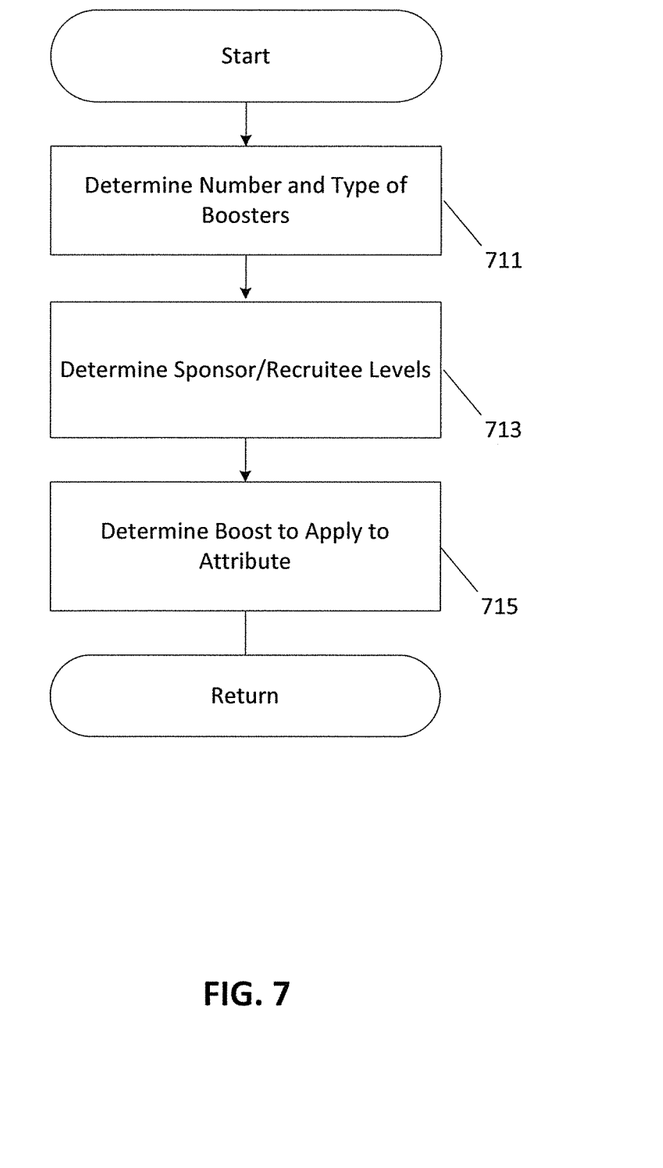
FIG. 7 is a flow diagram of a process for determining available sponsoring players in accordance with aspects of the invention.

FIG. 7 is a flow diagram of a process for determining available sponsoring players. In some embodiments the process is performed by a system such as the system of FIG. 1, in some embodiments by the game server 170 of the system of FIG. 1 or the game server 300 of FIG. 3, and in some embodiments by the social networking module 310 of the game server of FIG. 3. In some embodiments the process is performed as part of the process of FIG. 4, and in some embodiments the process performs operations of block 408 of the process of FIG. 4. In some embodiments the process of FIG. 7 is performed upon association of an item or character with a sponsoring player. In some embodiments the process of FIG. 7 is performed periodically. In some embodiments the process of FIG. 7 is performed upon a change in level of a sponsoring player. In some embodiments the process of FIG. 7 is performed upon occurrence of predefined game events, for example upon completion of a game scenario or other game event.

In block 711 the process determines a number of boosters and types of the boosters associated with an item or a character associated with a player. In some embodiments the boosters comprise, and in some embodiments consist of, sponsorships, and the types of boosters may comprise sponsors and recruits.

In block 713 the process determines a level of each of the sponsors and recruits. In some embodiments the level is a measure of a game level reached by game characters controlled by the sponsors and recruits. In some embodiments the level is a measure of experience of the game characters controlled by sponsors and recruits. In some embodiments the level is a measure of points acquired or attained by the game characters controlled by sponsors and recruits. In some embodiments the level is experience points acquired or attained by the game characters controlled by sponsors and recruits. In some embodiments experience points are acquired or attained by the game characters controlled by sponsors or recruits through accomplishment of defined game activities.

In block 715 the process determines a boost to apply to an attribute of the item or character associated with the player. In some embodiments the boost is a function of the number of sponsorships applied to the item. In some embodiments the boost is a function of the number and type of sponsorships applied to the item. In some embodiments the boost is additionally a function of the level of the game characters controlled by the sponsors and recruits. In some embodiments the number of sponsorships that may be applied to an item is limited in number. In some embodiments the boost for sponsorships in the form of recruits is greater than the boost for sponsorships in the form of sponsors.

The process thereafter returns.

Although the invention has been discussed with respect to various embodiments, it should be recognized that the invention comprises the novel and non-obvious claims supported by this disclosure.

What is claimed is:

1. A computer implemented method useful for video game play, comprising:
   receiving a request to associate a sponsoring player with an item of a game player, the game player and the sponsoring player being affiliated with one another in a social network;
   determining if the request is valid by a) determining that in a social network graph for the social network the game player and the sponsoring player are connected by no more than two edges and b) determining that the sponsoring player controls a game character with a game level above a predetermined level;
   associating the sponsoring player with the item of the game player if the request is valid; and
   determining a value for a boost for an attribute of the item based on the association of the sponsoring player with the item;
   wherein the value for the boost for the attribute is a function of the game level attained by the game character controlled by the sponsoring player.

2. The computer implemented method of claim 1, further comprising:
   receiving a further request to associate a further sponsoring player with the item;
   determining if the further request is valid;
   associating the further sponsoring player with the item of the game player if the further request is valid; and
   determining a value for an additional boost for the attribute of the item based on the association of the further sponsoring player with the item.

3. The computer implemented method of claim 1, wherein determining if the request is valid further comprises determining if the sponsoring player agreed to be a sponsor for the game player.

4. The computer implemented method of claim 1, further comprising redetermining the value for the boost for the attribute.

5. The computer implemented method of claim 4, wherein redetermining the value for the boost for the attribute occurs after a change in the level of the game character controlled by the sponsoring player subsequent to determining the value for the boost for the attribute.

6. The computer-implemented method of claim 2, wherein the item is associated with five different sponsoring players.

7. The computer-implemented method of claim 2, wherein the item is associated with ten different sponsoring players.

* * * * *